(12) United States Patent
Peri et al.

(10) Patent No.: US 10,565,577 B2
(45) Date of Patent: Feb. 18, 2020

(54) GUIDED POSITIONAL TRACKING

(71) Applicants: Christopher A. Peri, Mountain View, CA (US); Simon J. Gibbs, San Jose, CA (US); Sung Ho Park, San Jose, CA (US)

(72) Inventors: Christopher A. Peri, Mountain View, CA (US); Simon J. Gibbs, San Jose, CA (US); Sung Ho Park, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 15/373,859

(22) Filed: Dec. 9, 2016

(65) Prior Publication Data

US 2017/0178103 A1 Jun. 22, 2017

Related U.S. Application Data

(60) Provisional application No. 62/268,443, filed on Dec. 16, 2015.

(51) Int. Cl.
| | |
|---|---|
| G06Q 20/20 | (2012.01) |
| G06Q 20/32 | (2012.01) |
| G07G 1/00 | (2006.01) |
| G07G 3/00 | (2006.01) |

(52) U.S. Cl.
CPC ......... *G06Q 20/202* (2013.01); *G06Q 20/204* (2013.01); *G06Q 20/322* (2013.01); *G06Q 20/3224* (2013.01); *G07G 1/0054* (2013.01); *G07G 3/00* (2013.01)

(58) Field of Classification Search
CPC .............. G08B 13/246; G08B 13/2451; G08B 13/2465; G08B 13/2477; G08B 13/248; G08B 13/2482; G06K 7/10475; G06Q 20/202; G06Q 20/204; G06Q 20/3224; G07G 1/0054; G07G 3/00; G07G 20/322
USPC ................................ 340/572.1; 705/17, 26.1
See application file for complete search history.

(56) References Cited

U.S. PATENT DOCUMENTS

| | | | | |
|---|---|---|---|---|
| 7,512,567 | B2 * | 3/2009 | Bemmel ................ | G06Q 20/20 705/64 |
| 7,679,526 | B2 * | 3/2010 | Mardirossian ........ | G07F 17/246 340/932.2 |
| 8,209,219 | B2 * | 6/2012 | Fitzpatrick ............. | G06Q 10/04 705/15 |
| 8,216,195 | B2 * | 7/2012 | Wu ....................... | A61F 9/0008 215/306 |
| 8,259,309 | B2 * | 9/2012 | Kiyose ................... | G01B 11/14 356/614 |

(Continued)

OTHER PUBLICATIONS

George Wallner, "Stronger Security and Mobile Payments—Dramatically Faster and cheaper to Implement," a Looppay White Paper, 2014.

(Continued)

*Primary Examiner* — Andrew Joseph Rudy
(74) *Attorney, Agent, or Firm* — John King (57) ABSTRACT

A method of enabling a point of sale (POS) device to perform a transaction is described. The method comprises initiating, by an electronic device, the transaction with the POS terminal; analyzing images of the POS terminal captured by a camera of the electronic device; and identifying the POS terminal based upon the images.

30 Claims, 8 Drawing Sheets

(56) References Cited

U.S. PATENT DOCUMENTS

| | | | |
|---|---|---|---|
| 8,438,066 B1* | 5/2013 | Yuen | G06Q 20/206 |
| | | | 705/16 |
| 8,489,067 B2 | 7/2013 | Rackley | |
| 8,599,171 B2* | 12/2013 | Onishi | G06F 3/0421 |
| | | | 345/175 |
| 8,727,778 B2* | 5/2014 | George | G01D 5/39 |
| | | | 345/173 |
| 8,750,901 B1 | 6/2014 | Gupta | |
| 8,903,093 B2 | 12/2014 | Kim | |
| 8,977,567 B2 | 3/2015 | Aabye | |
| 9,070,122 B1 | 6/2015 | Geller | |
| 9,129,199 B2 | 9/2015 | Spodak | |
| 9,218,594 B2* | 12/2015 | Ramakrishna | G06Q 20/12 |
| 9,361,775 B2* | 6/2016 | Pineau | G08B 13/19608 |
| 9,373,230 B2* | 6/2016 | Argue | G06Q 20/20 |
| 9,400,978 B2* | 7/2016 | Laracey | G06Q 20/108 |
| 9,488,986 B1* | 11/2016 | Solanki | G06K 9/00791 |
| 9,569,764 B2* | 2/2017 | Craine | G06Q 20/20 |
| 9,576,285 B2* | 2/2017 | Zhou | G06Q 20/3278 |
| 9,754,444 B2* | 9/2017 | Lutnick | G06Q 30/02 |
| 9,794,392 B2* | 10/2017 | Hejl | H04M 1/7253 |
| 9,824,352 B2* | 11/2017 | Purves | G06Q 20/382 |
| 9,922,257 B2* | 3/2018 | Teller | G06Q 20/20 |
| 9,928,494 B2* | 3/2018 | Huang | G06Q 20/204 |
| 9,940,612 B1* | 4/2018 | Hamilton | G06Q 20/202 |
| 9,959,761 B2* | 5/2018 | Tsyrklevich | G08G 1/143 |
| 9,965,754 B2* | 5/2018 | Thrope | G06Q 20/204 |
| 10,115,094 B2* | 10/2018 | Lawrence | G06Q 20/102 |
| 10,121,112 B1* | 11/2018 | Vasquez, Jr. | G06Q 30/0234 |
| 10,157,413 B2* | 12/2018 | Landers, Jr. | G06Q 20/20 |
| 10,185,940 B2* | 1/2019 | Finley | G06Q 20/102 |
| 10,204,329 B2* | 2/2019 | Pugh | G06Q 20/20 |
| 10,204,402 B2* | 2/2019 | Yang | G06T 5/006 |
| 10,311,528 B1* | 6/2019 | Vasquez, Jr. | G06Q 50/08 |
| 10,325,255 B2* | 6/2019 | Purves | G06Q 20/382 |
| 10,360,551 B1* | 7/2019 | Perry | G06Q 20/202 |
| 10,395,018 B2* | 8/2019 | Turgeman | G06F 3/017 |
| 2005/0102233 A1 | 5/2005 | James et al. | |
| 2008/0093447 A1 | 4/2008 | Johnson | |
| 2008/0177640 A1* | 7/2008 | Gokturk | G06Q 30/02 |
| | | | 705/26.62 |
| 2009/0167699 A1 | 7/2009 | Rosenblatt | |
| 2010/0100457 A1* | 4/2010 | Rathod | G06Q 30/0601 |
| | | | 705/26.1 |
| 2011/0106656 A1* | 5/2011 | Schieffelin | G06Q 30/0603 |
| | | | 705/26.9 |
| 2011/0238517 A1 | 9/2011 | Ramalingam | |
| 2011/0320314 A1 | 9/2011 | Brown | |
| 2013/0141567 A1 | 6/2013 | Walker | |
| 2013/0320091 A1 | 12/2013 | Detwiler | |
| 2014/0139380 A1 | 5/2014 | Ouyang | |
| 2014/0156534 A1 | 6/2014 | Quigley | |
| 2014/0246490 A1 | 9/2014 | Graylin | |
| 2015/0235290 A1 | 2/2015 | Menahem | |
| 2015/0269582 A1 | 5/2015 | Simmons | |
| 2015/0278803 A1 | 10/2015 | Champaneria | |
| 2015/0302385 A1 | 10/2015 | Boncyk | |
| 2016/0210615 A1 | 7/2016 | Lee et al. | |

OTHER PUBLICATIONS

About Apple Pay in the US, Oct. 22, 2015.
UL Transaction Security-White Paper by Swen Van Klaargergen et al., "Mobile Payment Transactions: BLE and/or NFC?" 2015.
10-Tips for Payment Success, http:support.looppay.com, Mar. 27, 2015.
"What is iBeacon? A Guide to iBeacons." iBeacon.com Insider, Dec. 23, 2015.

* cited by examiner

GUIDED POSITIONAL TRACKING

RELATED APPLICATIONS

This application claims priority to provisional Application Ser. No. 62/268,443, filed on Dec. 16, 2015 which is incorporated by reference herein.

FIELD OF THE INVENTION

An embodiment of the present invention relates generally to mobile electronic devices, and in particular, to a system and method enabling guided positional tracking for an electronics device.

BACKGROUND OF THE INVENTION

Electronic payments between mobile devices and point-of-sales (POS) devices have become common. This type of electronic payment is a revolutionary way of making mobile payments by broadcasting to the magnetic reader on many POS terminals. However, many people do not understand this concept of not using a card having a magnetic strip, and hesitate trying to use the feature. Further, because of shielding on many POS terminals, the user must hold the electronic device in a certain position and orientation to maximize the odds of a successful transaction. In addition, there is a time limit from when the electronic device owner authorized the transaction (typically through a thumb scan) and when that authorization times out.

Therefore, circuits and methods that improve the reliability of financial transactions between an electronic device and a POS terminal configured to receive data by way of a magnetic reader would be beneficial.

SUMMARY OF THE INVENTION

A method of enabling a point of sale (POS) device to perform a transaction is described. The method comprises initiating, by an electronic device, the transaction with the POS terminal; analyzing images of the POS terminal captured by a camera of the electronic device; and identifying the POS terminal based upon the images.

An electronic device is also described. The electronic device comprises a processor configured to initiate a POS transaction with a POS terminal; and a camera, coupled to the processor, configured to capture images of the POS terminal; wherein the processor identifies the POS terminal based upon the captured images.

A non-transitory computer-readable storage medium having data stored therein representing instructions executable by a processor may also be implemented to perform a method comprising initiating, by an electronic device, the transaction with the POS terminal; analyzing images captured by a camera of the electronic device; and identifying the POS terminal based upon the images.

Other features will be recognized from consideration of the Detailed Description and the Claims, which follow.

DETAILED DESCRIPTION

While the specification includes claims defining the features of one or more implementations that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

A feature of other wireless mobile-to-POS systems is the reliance of broadcasting a signal to the magnetic reader that normally is accessed through 'swiping' a card with a magnetic strip through a guide rail. However, broadcasting a signal to the magnetic reader requires the user (i.e. the person trying to initialize the transaction) to place the electronic device in the correct location and orientation relative to the card reader. Because the additional step of aligning the electronic device with a POS terminal may take some time, a user initiating a transaction with an electronic device may have a difficult time successfully completing the transaction before a transaction timeout in the allowed transaction time occurs. The ability to complete a transaction before the timeout occurs (i.e. after a transaction timeout period expires) is further complicated when the user has never used this process of broadcasting a signal to the magnetic reader before, which may make it even more difficult to start the transaction before the authorization timer associated with a transaction timeout period times out. To help reduce these issues, an embodiment uses a combination of computer vision techniques (e.g., OpenCV) and a user interface (UI) to help instruct the user where to position the electronic device. Further the device can be configured to not start the timer until the electronic device has determined it is likely in the correct location. That is, transaction timeout a period before which a transaction would need to be completed would not be started until a user has properly aligned the electronic device in a location to successfully complete a transaction. Alternatively, the timeout period can be extended to allow additional time to properly position the electronic device to enable a wireless transaction. A recognition timeout period could also be established, during which the electronic device would need to identify the POS terminal, as will be described in more detail below. In addition to broadcasting a magnetic signal to a POS terminal, some embodiments may broadcast a magnetic signal and implement a near field communication (NFC) receiver, as will also be described in more detail below.

A description of exemplary embodiments is provided on the following pages. The text and figures are provided solely as examples to aid the reader in understanding the various embodiments. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention.

Figure 1:
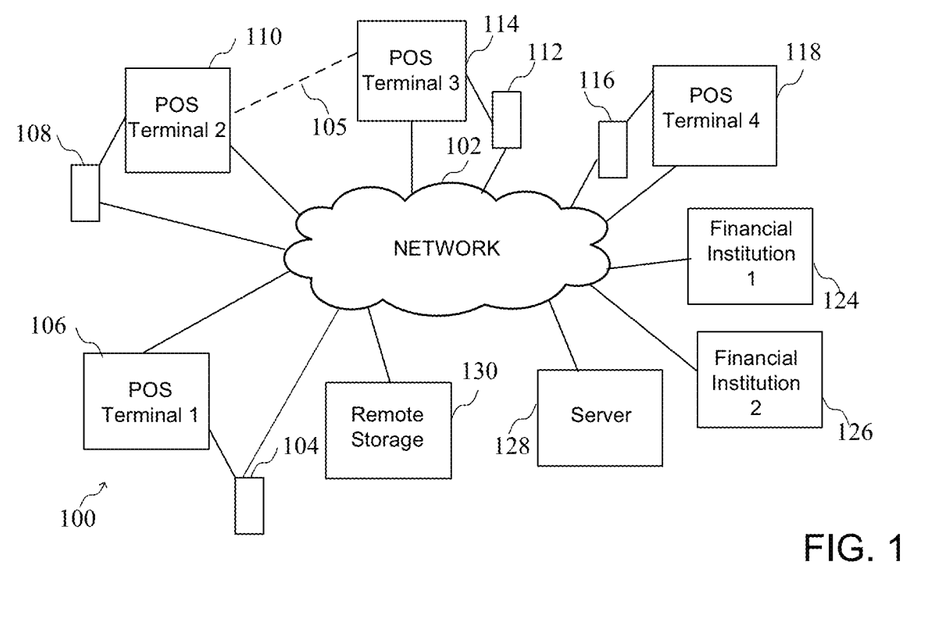
FIG. 1 illustrates an exemplary block diagram of a system for enabling a mobile payment transaction.

Turning to FIG. 1, a system 100 provides various elements associated with a network 102, which may be a wireless communication network for example. The system 100 comprises an electronic device 104 that may communicate with a POS terminal 106 that is within range to enable a financial transaction, such as a mobile payment for the purchase of a product or service at a merchant having the POS terminal 106. The electronic device could be any type of computer device enabling communication with a POS terminal, including but not limited to a mobile electronic device, a mobile phone, a smart phone, a portable computer, a tablet computer, or any other device enabling a communication with a POS terminal. The electronic device 104 can also communicate with the network 102 to enable receiving information to improve the likelihood that a communication between the electronic device and the POS terminal will be successful, as will be described in more detail below. Additional pairs of mobile devices and POS terminals are shown in the network of FIG. 1. More particularly, an electronic device 108 can also communicate with the POS terminal 110, an electronic device 112 can also communicate with the POS terminal 114, and an electronic device 116 can also communicate with the POS terminal 118. It should be noted that the POS terminals may be terminals having a guide track and corresponding magnetic reader enabling reading data from a card, such as a credit card having a magnetic strip as in done in conventional POS terminals. It also should be noted that each POS terminal may be associated with different merchant, or multiple POS terminals could be associated with a single merchant.

The network 102 enables communication between each of the electronic devices and POS terminals with another element of the system, such as a financial institution 124 or 126, remote storage 130, or a server 128. The remote storage 130 may be cloud-based storage. The server may be associated with another entity of the system, such as an electronic device manufacturer. It should be noted that each electronic device may communicate at different times with different POS terminals, and each POS terminal may communicate at different times with different electronic devices. The communication between a particular electronic device and a particular POS terminal in FIG. 1 is shown by way of example. Various network providers may transmit or receive data using the network 102, and various service providers may provide services, such as billing services associated with transactions using a POS terminal, that are implemented using one or more network providers on the network 102. The network 102 may implement different types of communication channels, such as wireless communication channels and wired communication channels, alone or in combination, to enable the transmission of data in the network 102 associated with a transaction between an electronic device and a POS terminal. The POS terminals could communicate with a financial institution, such as a first financial institution 124 or a second financial institution 126 to enable completing the financial transaction associated with the mobile terminal and the merchant having the POS terminal. The system may also comprise a server 128, which may store information related to the positioning of an electronic device with respect to a magnetic reader of POS terminals and the success of a communication between the electronic device and the POS terminals based upon the positioning of the electronic device with respect to a POS terminal. The server may be server associated with a manufacturer, for example, enabling the manufacturer of an electronic device such as a smart phone to provide value to their devices by enabling improved mobile transactions with POS terminals. That is, the server 128 may accumulate and store information related to the positioning of the electronic device with respect to the POS terminal for a variety of POS terminals or class of POS terminals, as will be described in more detail below. A remote storage device could be any storage device, such as memory associated with a server for example, that is not located on the electronic device. The remote storage device could be accessible and controlled by the user of the electronic device, such as a server at the user's residence, or could be cloud-based server controlled by the user, a service provider, or a manufacturer of the electronic device. As will be described in more detail below, the remote storage device stores information, such as images of POS terminals and instructions used to provide guidance for a user to successfully provide data using a wireless communication protocol from an electronic device to a POS terminal. The remote storage device may be controlled by the user, the manufacturer of the electronic device, or a service provider. According to one embodiment, the remote storage device enables storing data that would otherwise be stored on the electronic device, and therefore reduce the memory requirements of the electronic device for enabling mobile transactions with a POS terminal. Alternatively, the remote storage device may be accessible by a plurality of users of electronic devices to enable aggregating information associated with mobile transactions for the plurality of electronic devices, and therefore improving the chances of success in a mobile transaction between an electronic device and a POS terminal. The aggregated information may be accessible by the user of the electronic device or by the server. The aggregated information enables more accurate instructions for placement of the electronic device to be provided to the user. While FIG. 1 is just one example of a system for implementing a wireless payment network, it should be understood that additional elements or different elements could be implemented as part of the wireless payment network. Also, it should be noted that not all of the elements of the system of FIG. 1 are required to provide guided positional tracking, but are just included to provide an exemplary system. For example, guided positional tracking can be provided using only an electronic device and a POS terminal as will be described in more detail below.

Figure 2:
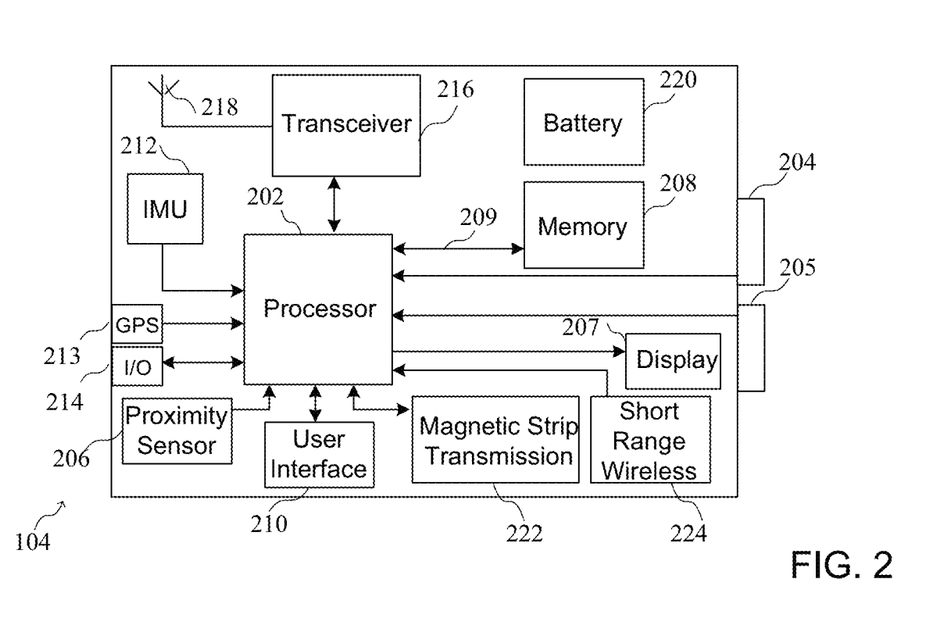
FIG. 2 illustrates an exemplary block diagram of an electronic device of the system of FIG. 1.

Turning now to FIG. 2, the electronic device 104 comprises a processor 202 coupled to one or more cameras 204 and 205. As will be described in more detail below, the processor may identify a POS terminal based upon images captured by a camera of the electronic device or some other device and proximity information as will be described in more detail below. The electronic device 104 could be any type of device adapted to transmit and receive information, such as a mobile phone, a smart phone, a portable computer, a laptop computer, a tablet computer or other electronic device providing information. A proximity sensor 206 could also be implemented to determine the location of the electronic device 104 with respect to another device, such as a POS terminal. The proximity sensor 206 could be an infrared (IR) sensor, near field communication (NFC) sensor, time of flight sensor, depth sensor, ultrasonic sensor, or radio frequency (RF) sensor, for example. The processor could be coupled to a display 207 for displaying information to a user. The display could be any type of display, such as an LCD, OLED, ELD, plasma, or any other display technology. The processor 202 may also be coupled to a memory 208 that enables storing information related to a mobile payment function, such as POS terminal information location information, and transaction success information associated with mobile payment transactions. The memory 208 could be implemented as a part of the processor circuit 202, or could be implemented separate from or in addition to any cache memory of the processor circuit, as is well known. The memory 208 could be a RAM, ROM, SSD, HDD or any other type of memory that would enable the electronic device to perform a transaction with a POS terminal. The processor could be an ARM processor, an X86 processor, a MIPS processor, or any processing circuit configured to execute instructions stored in memory. A user interface 210 is also provided. The user interface 210 may include buttons or other user selectable actuators, a keypad, a microphone for audio input, a speaker for audio feedback, vibration elements for tactile feedback, and any other input or output element that enables the operation of the electronic device during a transaction with a POS terminal The user interface may also be associated with the display 208, which may be touchscreen display for example to enable input by a user in addition to displaying information to the user. The processor 202 may also be coupled to other elements that receive inputs or provide information. For example, an inertial measurement unit (IMU) 212 can provide various information related to the motion or orientation of the device, while GPS 213 provides location information associated with the device. The IMU 212 may include a gyroscope and an accelerometer for example. The processor circuit 202 may receive input by way of an input/output (I/O) port 214 or a transceiver 216 coupled to an antenna 218. While a single I/O port is shown, it should be understood that multiple I/O ports could be implemented, and could include a USB port, ad USB type C port, a Lightning port implemented by Apple Inc., or any other I/O port that would enable the transfer of data. The electronic device 104 also comprises a magnetic secure transmission (MST) circuit 222, and may optionally include a short range wireless circuit 224. The short range wireless circuit 224 may be a Bluetooth transceiver, Bluetooth Low Energy (BLE) transceiver, Near Field Communication (NFC) transceiver, or any other wireless transceiver for transferring data between the electronic device and the POS terminal. As will be described in more detail below, the electronic device 104 may direct a user of the electronic device to initiate the transaction using the magnetic secure transmission (MST) circuit 222 or the short range wireless circuit 224.

Figure 3:
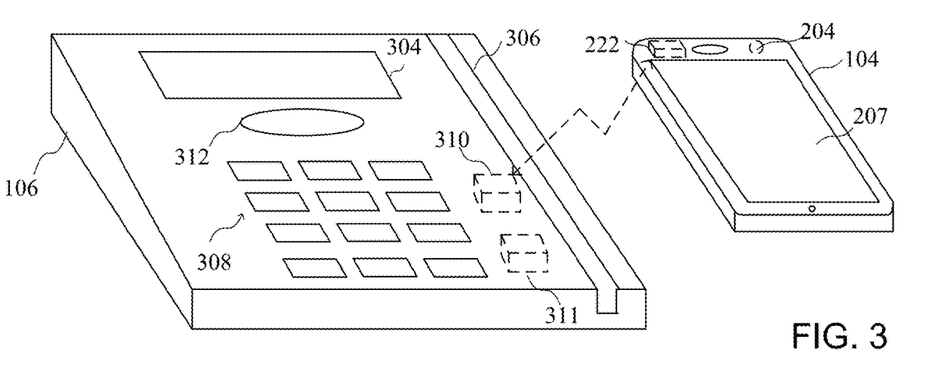
FIG. 3 illustrates an exemplary arrangement of a POS terminal and an electronic device associated with a mobile payment transaction.

Turning now to FIG. 3, an exemplary arrangement of an electronic device functioning as a payment terminal and an electronic device associated with a mobile payment transaction is shown. A POS terminal 106, which may be a POS terminal installed in a merchant location for example, is able to communicate with electronic device 104. The POS terminal may be stand-alone terminal used on a counter of an electronic device functioning as a merchant or as a part of a computer, such as attached to a display of a computer enabling a mobile transaction. The POS terminal 106 may comprise a display 304 enabling a user of the POS terminal to see information or receive instructions, and a track 306 that guides a card having a magnetic strip to be read by a magnetic reader 310. The POS terminal may also have a short range wireless transceiver 311, such as a Bluetooth transceiver, BLE transceiver or a near field communication (NFC) transceiver or some other transceiver corresponding to a transceiver or the electronic device 104, to allow for communication between the electronic device 104 and the POS terminal 106. While a single transceiver 311 is shown, it should be understood that multiple transceiver enabling communication between the electronic device 104 and the POS terminal 106 could be implemented to accommodate a variety of electronic devices. The electronic device 104, shown in FIG. 3 may include a magnetic secure transmission circuit 222 that provides data, such as credit or debit card data that would normally be transmitted to a POS terminal by a card having a magnetic strip, to be received by the magnetic reader 310. The POS terminal may also comprise a logo 312 which may enable identifying at least the manufacturer, and possibly the model of the POS terminal based upon the location of the logo for example. As will be described in more detail below, a camera 204 can be used to identify the POS terminal or a class of devices that includes the POS terminal. The camera may be used to read the manufacturer in the logo by optional character recognition (OCR). A class of the POS terminal may be defined as a device that belongs to a general collection of POS terminals that share the same shape and general magnetic head position. The positioning of mobile device with respect to the POS terminal can also be aided by the camera 204, which can detect features of the POS terminal, such as the shape of the POS terminal, or the location of particular elements of the POS terminal, such as the keypad, stylus, display, privacy guard, cables, logos, or swipe or guide track. While some characteristics may enable identifying a particular model of a POS terminal, it may only be possible to identify a class of POS terminals. However, knowing the class can give important information related to the location of the magnetic reader or information related to electronic shielding used in the POS terminals which will affect the communication between the electronic device and the POS terminal.

According to one embodiment, a number of technologies and techniques may be combined to guide and optimize the user experience when using an electronic device to execute a wireless transaction to a magnetic card reader of a POS terminal (or other device that uses magnetic means of communication) with an electronic device. An embodiment describes an approach that uses computer vision techniques and a graphical user interface (GUI) that guides the placement and timing of a wireless POS transaction to improve user experience, reduce new user confusion, and reduce timeouts such as a timeout after a transaction period when an electronic device is authorized to perform a transaction. A transaction timeout occurs when a period of time, known as a timeout period, elapses after a transaction has started but has not been successfully completed. That is, the electronic device may allow a user to attempt to implement a transaction with a POS terminal during the transaction timeout period. If the user is unable to complete the transaction during the transaction timeout period, the electronic device may prevent the user from continuing to attempt to implement the transaction. As will be described in more detail below, a timeout period may also be established for an electronic device to be properly aligned with the POS terminal to enable a successful transaction.

When a transaction is initiated by the user, a typical RGB(d) camera(s) located on the electronic device may be employed. Data from the camera(s) can be analyzed to determine the various aspects, such as: 1) what type (i.e. model) of POS system is the subject of the transaction, or 2) if the model cannot be determined, whether the location of the magnetic reader can be determined by the shape and shading of the POS (i.e. the class of POS terminals it falls under). Once the POS terminal or class of devices is determined, the user can be guided to employ NFC or the magnetic swipe head. According to one embodiment, an optimum position for a transaction with the electronic device and the POS terminal can be found, where a transaction can be performed when the electronic device is within a certain range associated with the optimum position. While the optimum position of the electronic device with respect to the POS terminal is a position that would have the greatest likelihood that a transaction between the electronic device and the POS terminal would be successful, the electronic device may guide a user to initiate a transaction between the POS terminal when the electronic device is at a preferred position. That is, a preferred position may be a position of the electronic device that is with a given range of the POS terminal, and may include the optimal position or may be the optimal position. The range may be defined as a distance between the MST circuit 222 and a certain location of a POS terminal, such as a known location of an MST receiver of the POS terminal or a general location of an MST receiver of a class of POS terminals. Alternatively, a preferred position may be determined by a likelihood of success of a transaction between the electronic device and the POS terminal, where the likelihood of success could be a percentage transaction success rate for example. The likelihood of success can be determined based upon an individual user's success in transactions over time with a particular POS terminal or class of POS terminals, or aggregated data based upon a plurality of users, where the aggregated data may be stored on the electronic device or a on a remote storage device as described above. Therefore, a preferred position may not be a distance to an element of a POS terminal, but rather a region or groups of regions where a transaction between an electronic device and a POS terminal would have a certain likelihood of success. That is, while a preferred position may be based upon an optimal position in some embodiments, a preferred position may have no relation to an optimal position in other embodiments. Once the optimum position and/or preferred position of the electronic device are determined using the combination of various sensors on the device, the electronic device will begin its broadcast to perform the transaction.

It should also be noted that some POS terminals may have an NFC receiver in addition to the magnetic reader, and therefore the transaction may be completed different ways. Therefore, it may be necessary to select the type of transaction that is performed. According to one embodiment, a user could select the type of transaction that should be performed. According to another embodiment, a user could set a preference in advance (i.e. which type of transaction to perform, such as NFC or magnetic, when both are available) so that the user would not need to select the type of transaction during the transaction during the transaction. According to other embodiments, the mobile device may automatically select the desired form of the transaction. Alternatively, some other party such as the server which may be controlled by the mobile device manufacturer or a financial institution associated with the transaction, may select the type of transaction.

The electronic device can be used in determining the specific model of the POS terminal or a class including the POS terminal. The determination may involve using available sensors on the electronic device to obtain information about the POS terminal. This may include, but is not limited to, capturing images of the POS terminal (e.g., using the camera). Computer vision techniques, such as techniques implemented in OpenCV, may be employed to compare the images captured against a database of features for known POS systems. Computer vision techniques may include analyzing images for purposes of both identifying a POS terminal and aiding in the guidance of the electronic device to the POS terminal during a transaction between the electronic device and the POS terminal. This analysis may return a match and a respective level of confidence. Many POS machines have similar features, the placement of the card reader, its orientation, placement of a numeric keypad, placement of the NFC readers, etc. POS terminals can be grouped into classes that have these similar features in common. If no match is found, or the level of confidence is too low (e.g., below a threshold), the process may not be repeated but instead, only the class of POS is determined. By determining the class and likely position of the magnetic read head, the POS machine can be determined. If the class of POS cannot be found or the confidence of a match is too low, the GUI may display an 'unknown' POS state and provide a simple generic graphic or animation of placing an electronic device over a typical POS machine, such as based upon a typical location of the magnetic head position in relation to a guide track for receiving a card having a magnetic strip.

The operation and processing associated with guiding a user to an optimal or preferred location for performing a transaction between an electronic device and a POS terminal is performed on the mobile electronic. According one implementation, a Deep Learning (DL) algorithm may be running on electronic device without any connection to server or remote storage. According to one embodiment, the recognition of the POS terminal is based upon images of POS terminals stored on the electronic device. According to other embodiments, the POS recognition could be based upon pictures of POS terminals received from the remote storage. Further, the processing for providing guidance to the user may be performed by the processor of the electronic device, such as processor 202. According to other embodiments, the processing could be performed remotely, such as by the server 128. The remote storage 130 is useful for storing image taken by mobile camera, which can help optimizing the DL model to improve performance. According to some embodiments, the DL model optimization can be done offline and also online/on-device using self-learning algorithm.

The following describes an example implementation of an electronic device receiving guidance during an initiation of a transaction. Once a POS terminal or class of POS terminals has been identified, sensors on the electronic device, typically but not limited to the camera, employs computer vision techniques to continually determine the location and orientation of the electronic device relative to the POS machine. GUI elements displayed on the electronic device may instruct the user to move the electronic device towards the POS terminal. As the electronic device is moved towards the POS terminal, the electronic device may utilize a computer vision solution to continually track the relative location of the electronic device to the POS system. A live image provided by the camera or an animation provided on the GUI in the event that the camera cannot track the POS terminal may take into account the current position of the electronic device and the optimum placement or preferred placement of the electronic device to the magnetic reader of the POS terminal. The position and orientation of this optimal placement or preferred placement can be manually determined based upon the success of transactions over time and stored either on the electronic device 104 or stored remotely on remote storage 130 and accessed via the electronic device 104 or the server 128.

The relative distance, returned in either metric or empirical units are provided to the GUI. The orientation data, which is associated with and generated by a user device-centered coordinate system, which may be a 3D coordinate system for example, includes a six-degree of freedom (6DoF) data set wherein the orientation data includes XYZ coordinates and pitch, yaw, and roll data related to a rotation of the electronic device. This orientation data is continually provided to the GUI of the electronic device until it is determined that the optimal or preferred position and orientation of the electronic device relative to the POS terminal has been achieved. Optionally, a unique combination of computer vision techniques and the use of a proximity sensor will determine the optimal location or preferred location and orientation of the electronic device to the POS terminal. According to one embodiment, this may be achieved by combining the resolved distance and/or orientation using computer vision techniques and the distance determined by a proximity sensor. While the distance may be generated by the mobile device using computer vision techniques or the use of sensors in one embodiment a POS terminal can determine distance and communicate the distance to the mobile device using similar techniques in another embodiment. The relative distance to the POS terminal may be provided for learning purposes or may be used in guidance. If the distance is within a set parameter, the wireless transaction system (typically an app) will begin its wireless transaction. If the POS terminal model is identified, the wireless broadcast protocol for the POS may be employed. If multiple wireless broadcast protocols are available, one of the protocols will selected as set forth above.

Figure 4:
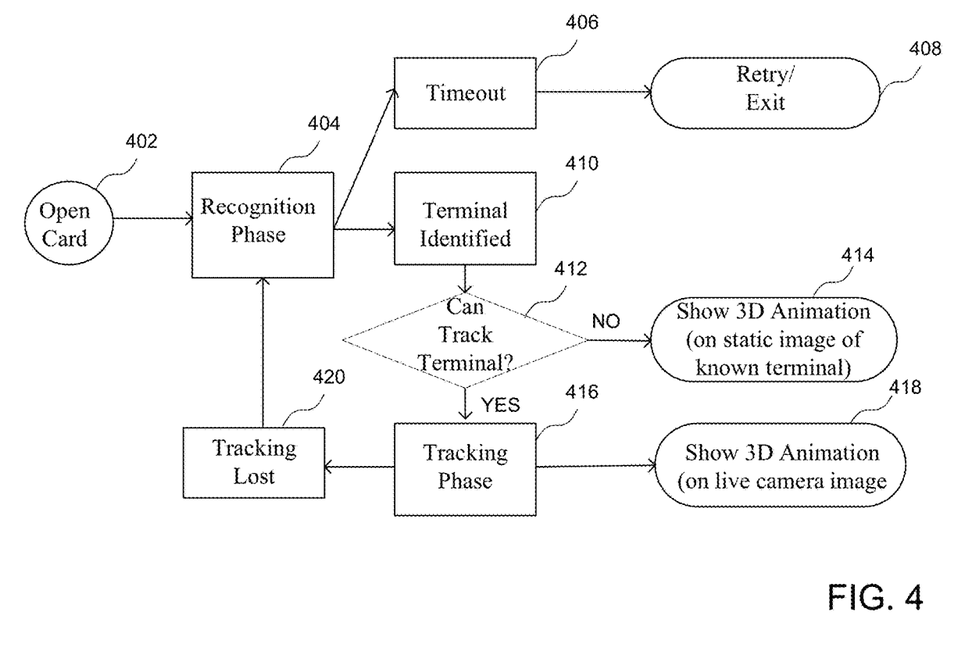
FIG. 4 illustrates a flow chart showing an exemplary method of implementing a mobile payment transaction.

Turning now to FIG. 4, a flow chart shows an exemplary method of implementing a mobile payment transaction. A "card," such as an electronic card associated with a credit or debit card stored in a "wallet" application of the electronic device, is opened at block 402. A recognition phase can be performed at block 404, where the electronic device determines if it is within range of a POS terminal that may be available for a transaction. A timeout period, during which the electronic device may implement a mobile transaction, may be established at block 406. If the timeout period has expired, the electronic device will retry or exit the transaction at block 408. It should be noted that the timeout period can be extended to take into account the time required to identify the POS terminal.

The electronic device can identify the POS terminal at block 410, such as by using the camera on the electronic device to identify a specific model having a magnetic reader at a particular location, or a class of POS terminals which may have the magnetic reader at a general location, as described above. The POS terminal could also be identified based upon GPS information associated with previous transactions between the electronic device and the POS terminal, where such previous transactions may be stored either on the electronic device or retrieved from a server aggregating device information in remote storage. At block 412, the electronic device determines whether it can track a particular POS terminal. For example, the electronic device determines whether a camera, such as a rear-facing camera of the electronic device is obscured by some other object or is so close to the POS terminal that it cannot focus on the POS terminal. The camera settings can be adjusted as the device is moved during the POS terminal identification process to attempt to identify the POS terminal. If the electronic device cannot track the terminal, a 3D animation on a static image of a known terminal may be shown on the display of the electronic device, as exemplified in block 414. That is, the 3D animation will show an image of the device in relation to the known terminal, and guide the user to position the electronic device in the correct position with respect to the POS terminal to improve the chances that the magnetic reader of the POS terminal will receive the magnetic signals providing data associated with a credit or debit card to enable a financial transaction. If the electronic device can track the POS terminal at the block 412, the electronic device enters a tracking phase at block 416, during which the mobile provides a live 3D animation utilizing a live image of the POS terminal captured from the rear-facing camera of the electronic device. If tracking is lost at block 420, the electronic device will return to the recognition phase at block 404.

Figure 5:
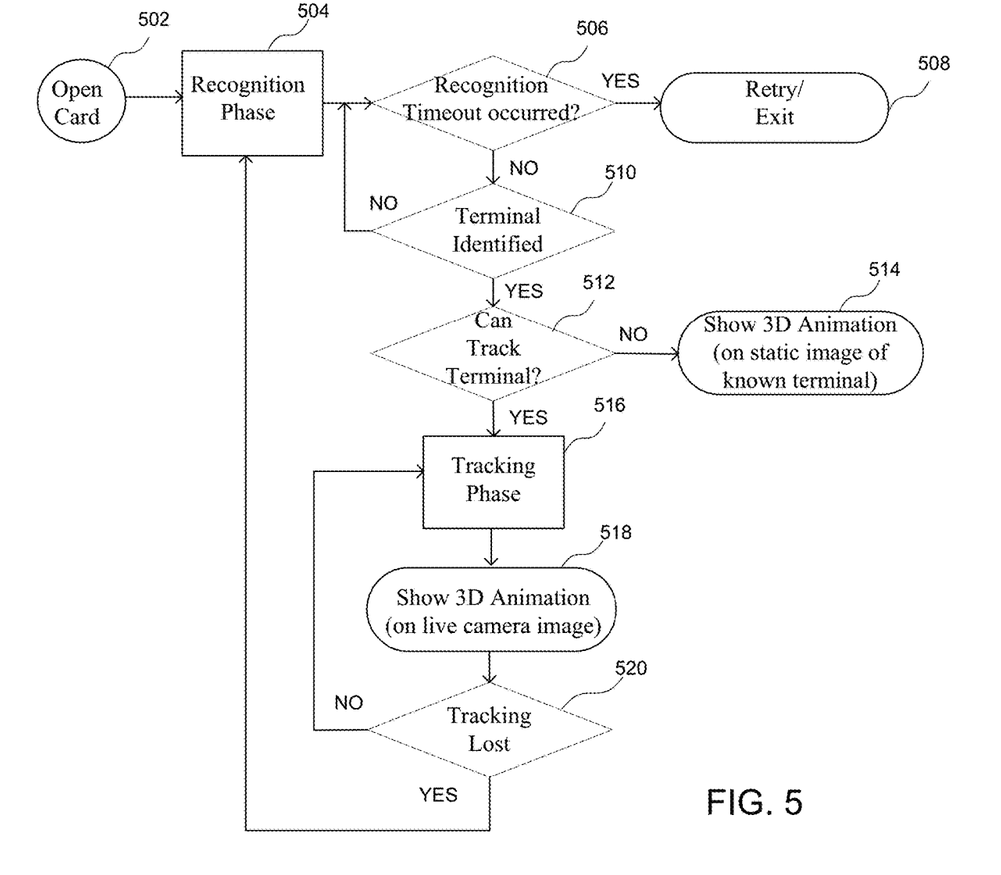
FIG. 5 illustrates a flow chart showing another exemplary method of implementing a mobile payment transaction.

Turning now to FIG. 5, a flow chart shows another exemplary method of implementing a mobile payment transaction. After a card in an electronic wallet is open in an electronic device at block 502, a recognition phase can be performed at block 504. A recognition timeout can be established for the recognition of the POS terminal, where it is determined whether a recognition timeout has occurred at block 506. That is, a recognition period that is allowed for an electronic device to recognize a POS terminal may be established, where a timeout will occur at the end of the timeout period if the POS terminal or class of POS terminals is not recognized. During the recognition period, it is determined whether the POS terminal or class of POS terminals is identified at block 510. If a recognition timeout occurs at block 506, the electronic device will retry the transaction or exit at block 508. For example, the electronic device may attempt to identify the POS terminal a predetermined number of times before exiting the recognition phase. Once identified, the identification of the POS terminal may be stored in memory. If the POS terminal cannot be recognized, a user may still be able to make the transaction by attempting a payment when the electronic device is positioned in proximity to the POS terminal. That is, the user of the electronic device would be able to initiate a transaction by making a selection on the GUI of the electronic device and positioning the electronic device near the POS terminal.

It is then determined whether the electronic device can track the POS terminal using a camera at block 512. If the electronic device cannot track the POS terminal with a camera, a 3D animation on a static image of a known terminal will be shown on the display of the electronic device at block 514. The device can track the POS terminal using an accelerometer, inertial motion sensor, proximity sensor, or any other sensor on the electronic device that would help to track the movement the electronic device with respect to the POS terminal. If the electronic device can track the POS terminal using a camera, a tracking phase will be entered at block 516, where a 3D animation will be shown on the display using an image generated by the camera at a block 518. It is then determined if the electronic device has lost tracking of the POS terminal at block 520. If the electronic device has been able to maintain tracking, it will continue to show the 3D animation on the display at the block 518. However, if tracking using the camera is lost, the electronic device will return to the recognition phase at block 504. Optionally, if tracking is lost and prior to returning to the recognition phase, the electronic device may be configured to attempt to re-establish tracking. Such attempts may be limited in number. In another embodiment, if tracking is lost, the electronic device may proceed to block 514 and display a 3D animation on a static image of a known terminal.

Figure 6:
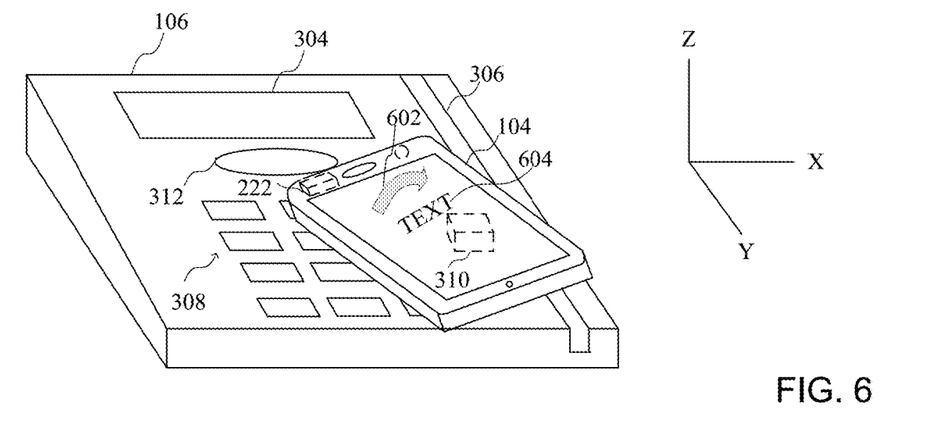
FIG. 6 illustrates an example of an orientation of an electronic device with respect to a POS terminal to achieve a preferred position for conducting a mobile payment transaction.

Turning now to FIGS. 6-9, a series of drawings shows the orientation of an electronic device with respect to a POS payment terminal to achieve a preferred position for conducting a mobile payment transaction is shown. While a series of four drawings is shown, it should be understood that the four drawings are shown by way of example, and that the process to reach a preferred or optimal positioning of the electronic device could take any number of steps, which would be determined based upon the movement of the electronic device toward the POS terminal by the user. Further, while the drawings of FIGS. 6-9 are shown as particular points in time, it should be understood that the process of reaching a preferred or optimal positioning of the electronic device with respect to the POS terminal need not be achieved in separate movements of the electronic device, but rather may be a part of a fluid motion where the guidance instructions to the user may be continuously changing as the electronic device is moved to different positions. That is, the drawings of FIGS. 6-9 are provided by way of example to show the types of instructions that may be provided at certain points of time, but greater or fewer guidance instructions may be needed depending upon the movement of the electronic device by the user. As shown in FIG. 6, the electronic device 104 is positioned over the POS terminal 106. However, as can be seen in FIG. 6, the magnetic secure transmission circuit 222 is not aligned with the magnetic reader 310, and is in a position where an attempt to perform a financial transaction would likely fail. Therefore, in addition to an image of the POS terminal on the display, guidance elements to help guide a user to a preferred position for the electronic device are provided on the display of the electronic device. The guidance elements could include arrows 602 to provide directions for necessary movements of the electronic device, as well as text 604 to provide instructions corresponding to the arrows to further aid in the guidance. The arrows could be implemented in 3D to provide rotation guidance in any plane according to the XYZ coordinates shown in FIG. 6. The arrow 602 of FIG. 6 could show that the user is to swivel the electronic device in the X-Y plane. The guidance may be updated based upon the where the electronic device is moved by the user. Such updates may occur in real-time. For example, according to the orientation of the electronic device in FIG. 6 before it is moved, it may be necessary to tilt the electronic device about the x-axis to a position that is parallel with the top surface of the POS terminal. Audio guidance could also be provided by way of a speaker or other compatible auditory device of the electronic device to further help guide the user of the electronic device.

Figure 7:
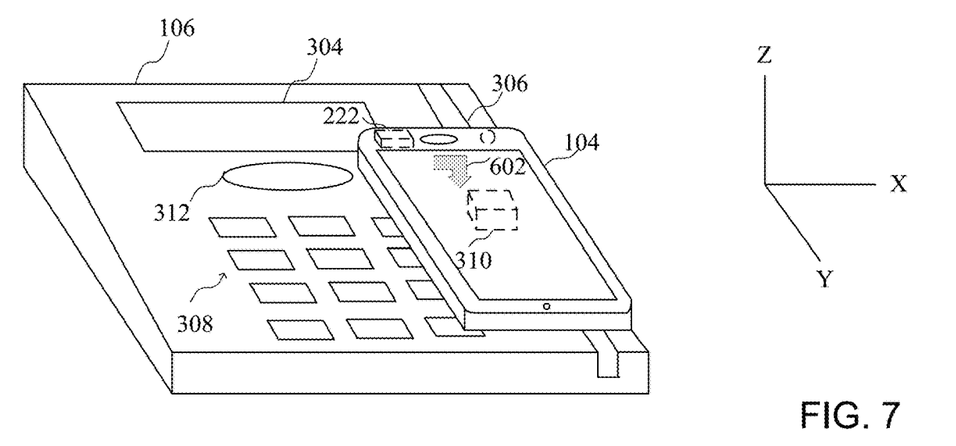
FIG. 7 illustrates an example of an orientation of an electronic device with respect to a POS terminal to achieve a preferred position for conducting a mobile payment transaction.
Figure 8:
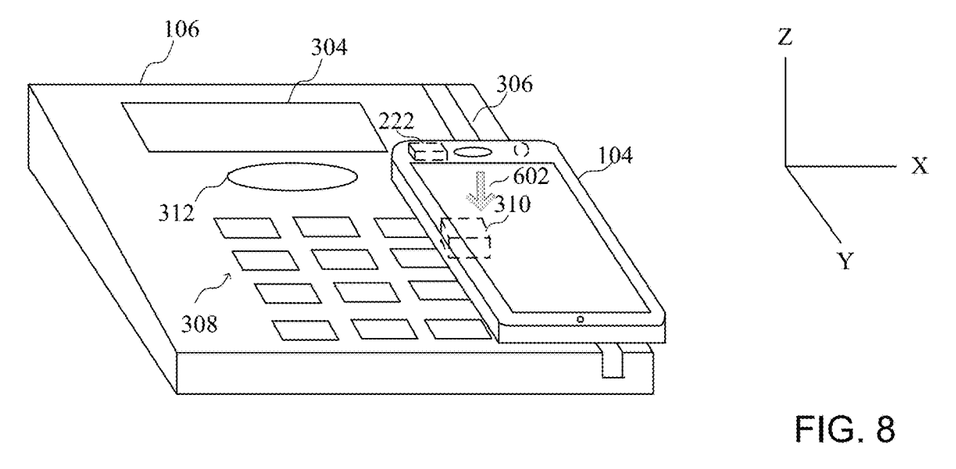
FIG. 8 illustrates an example of an orientation of an electronic device with respect to a POS terminal to achieve a preferred position for conducting a mobile payment transaction.
Figure 9:
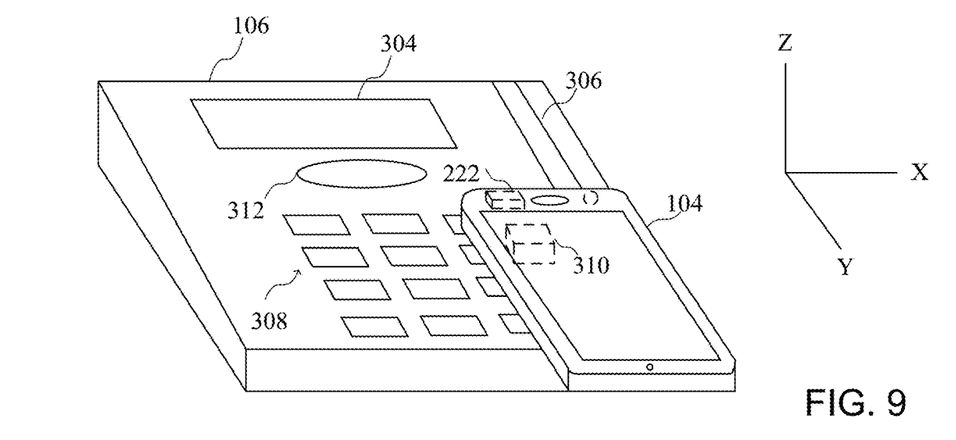
FIG. 9 illustrates an example of an orientation of an electronic device with respect to a POS terminal to achieve a preferred position for conducting a mobile payment transaction.

As shown in FIG. 7, while the user has moved the electronic device to a better position by swiveling the device in the X-Y plane and positioning the electronic device parallel to the top surface of POS terminal, the arrow 602 now shows that the electronic device needs to be moved to the right along the X-axis and down toward the end of the POS terminal along the Y-axis. As shown in FIG. 8, the electronic device is positioned in a better location, where the magnetic secure transmission circuit 222 is generally aligned with the magnetic reader 310, but the electronic device is not close enough to the POS terminal. Therefore, the arrow 602 in FIG. 8 shows that the electronic device should be moved downward along the Z-axis toward the POS terminal. After being moved along the Z-axis, the electronic device is now aligned with the POS terminal where the magnetic secure transmission circuit 222 is in a preferred position relative to the magnetic reader 310 as shown in FIG. 9. The preferred position can be determined based upon a physical distance and the orientation of the electronic device with respect to the POS terminal, or both. The preferred position could be an absolute position, or range of positions defined by the XYZ coordinates and the location of the magnetic reader. The position of range of positions may be also be defined by the yaw, pitch and roll of the electronic device. The preferred position can be determined based upon empirical data generated by a manufacturer of the device, data determined by the electronic device during attempts at performing financial transactions, or aggregated data across a number of different electronic devices and different POS terminals, as will be described in more detail below.

Figure 10:
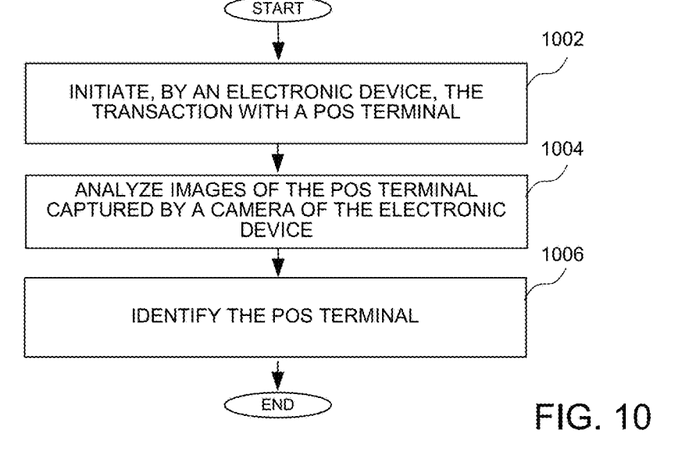
FIG. 10 illustrates a flow chart showing another exemplary method of enabling a mobile payment by identifying a POS terminal in a transaction.

Turning now to FIG. 10, a flow chart shows an exemplary method of enabling a mobile payment by identifying the POS terminal used in the transaction. The method of FIG. 10, as well as the methods of FIGS. 11-14 set forth below, could be implemented as described in FIGS. 1-9, or using other circuits. In particular, the transaction with the POS terminal is initiated by an electronic device at a block 1002. The transaction could be initiated by the user making a selection of an app on an electronic device, such as a smart phone, where the app will enable the transfer of data after the electronic device is placed in the preferred position. Images of the POS terminal captured by a camera of the electronic device or otherwise accessed by the electronic device are analyzed at a block 1004. The images taken using a camera on the electronic device for example, or accessed, locally or remotely, based upon a previous transaction with the POS terminal, such as based upon a location of the POS terminal which could be based upon a GPS location. The POS terminal is identified based upon the images at a block 1006.

Figure 11:
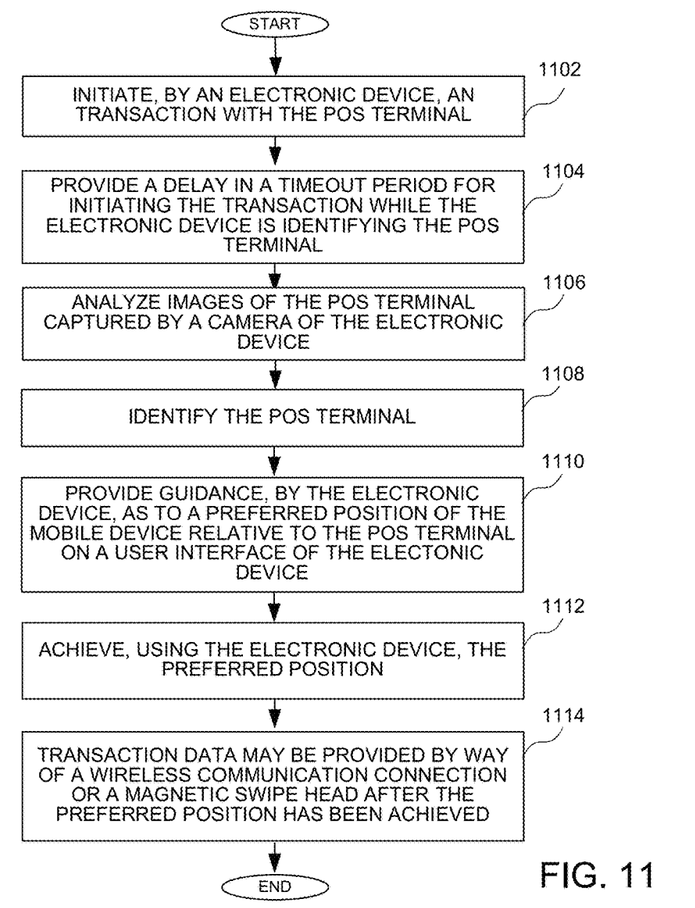
FIG. 11 illustrates a flow chart showing an exemplary method of enabling a mobile payment by identifying a POS terminal in a transaction.

Turning now to FIG. 11, a flow chart shows another exemplary method of enabling a mobile payment by identifying the POS terminal used in the transaction, and includes additional elements that may be performed during a transaction. That is, in addition to identifying the POS terminal as set forth in FIG. 10, guidance could be provided on a GUI of the electronic device to improve the likelihood of achieving a successful transaction. In particular, a transaction with the POS terminal is initiated by an electronic device at block 1102. The electronic device and POS terminal could be any of the electronic devices and POS terminals as described in reference to FIGS. 1-9 above, or other suitable mobile devices and POS terminals. The transaction may be initiated in response to the accessing of a card from an electronic wallet using an app for example, where the app will enable the transfer of data after the electronic device is placed in the preferred position. A delay in a timeout period for initiating the transaction can be provided while the electronic device is identifying the POS terminal at block 1104. That is, the delay could be a recognition timeout period as set forth above. The delay could be determined based upon an average additional time required for an electronic device to guide a user of an electronic device to an optimal position a preferred position with respect to the POS terminal. Images of the POS terminal captured by a camera of the electronic device or otherwise accessed by the electronic device are analyzed at block 1106. Computer vision techniques, including the use of a camera and analyzing images of the POS terminal, are employed to identify the POS terminal at block 1108.

Guidance as to an optimal or a preferred position of the electronic device relative to the POS terminal is provided on a user interface of the electronic device based upon the identity of the POS terminal at block 1110. The guidance could be provided by the use of elements on the display, including animation or text associated with an actual view of the POS terminal or a picture of the POS terminal on the display, or audio guidance as described above. The electronic device may achieve the preferred position at block 1112. The transaction data may then be provided by way of a wireless communication connection or a magnetic swipe head after the preferred position has been achieved at block 1114. That is, for a terminal that includes an NFC transceiver, the electronic device may provide an indication to select a particular one of the NFC transceiver or the magnetic reader for the financial transaction. For example, certain banks may prefer NFC transactions for security reasons. Because there may be benefits or disadvantages to using the NFC transceiver or the magnetic reader, the electronic device will provide guidance to the user to select a preferred form for the transaction. Alternatively, the electronic device may select the wireless protocol used for the transaction automatically, or may be instructed by another entity, such as a server or a financial institution involved in the transaction.

Figure 12:
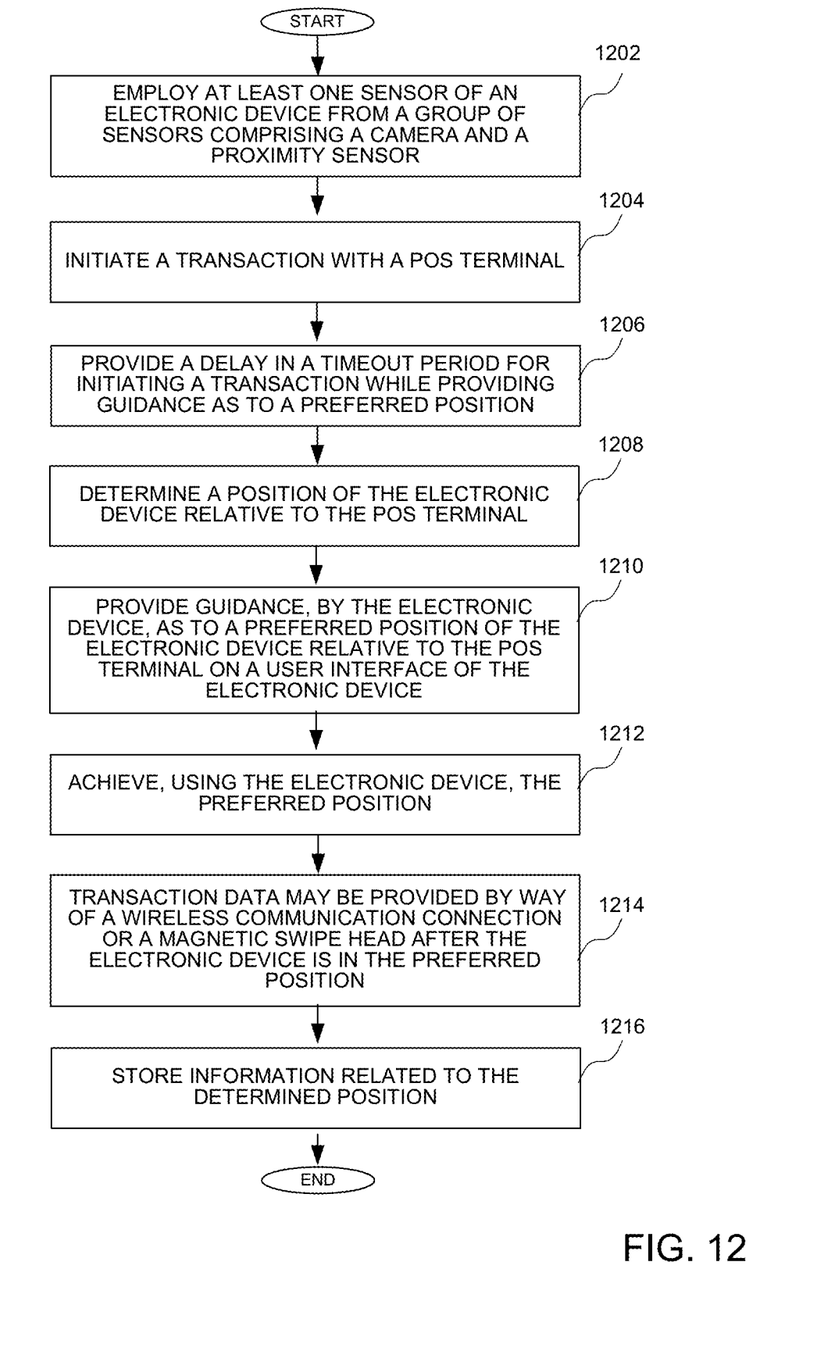
FIG. 12 illustrates a flow chart showing an exemplary method of guiding an electronic device in a mobile payment transaction between the electronic device and a POS terminal.
Figure 13:
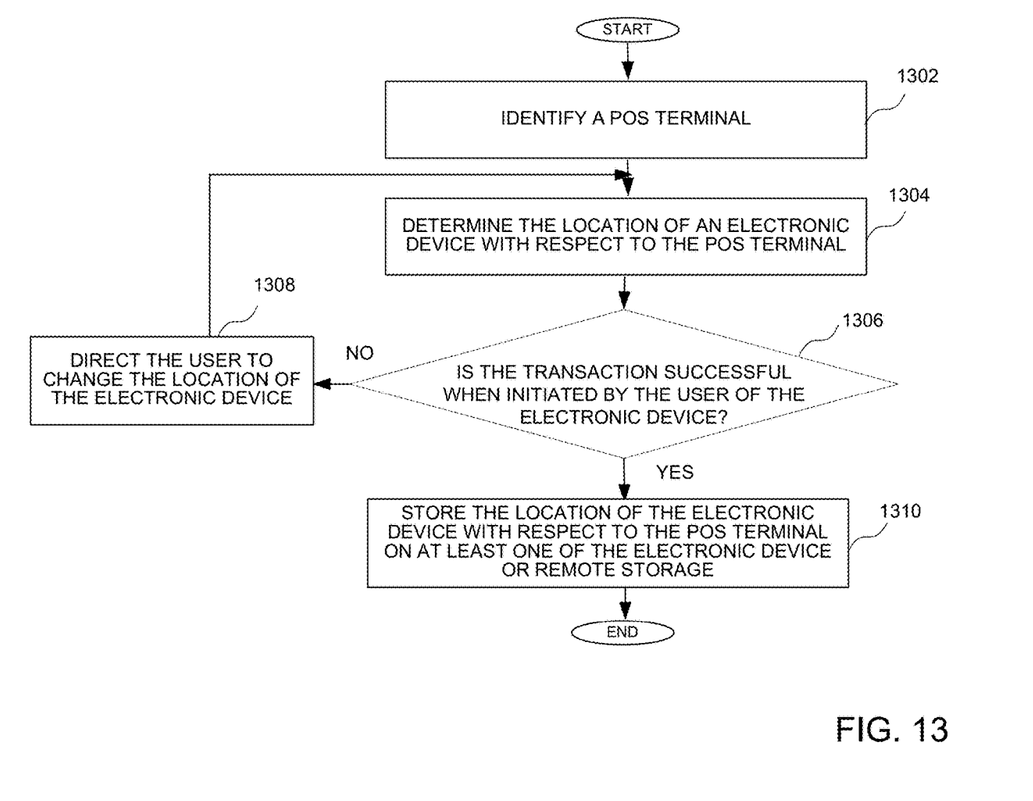
FIG. 13 illustrates a flow chart showing an exemplary method of testing and storing data associated with mobile payment transactions using an electronic device.

Turning now to FIG. 12, a flow chart shows an exemplary method of enabling a mobile payment transaction between an electronic device and a POS terminal. That is, the method of FIG. 12 provides guidance for a positioning of the device for a transaction based upon a determination of a position of the device with respect to the POS terminal. At least one sensor can be employed at block 1202. The sensors could comprise or more of an accelerometer, inertial motion sensor, proximity sensor, or any other sensor that would help to track the movement the electronic device The transaction with the POS terminal may be initiated at block 1204. A delay in a timeout period for initiating a transaction may be provided while providing guidance as to the preferred position at block 1206. The delay could be provided by extending the transaction timeout period, or by adding an additional recognition timeout period as set forth above. A position of the electronic device relative to the POS terminal is determined at block 1208. Guidance as to an optimal or a preferred position of the electronic device relative to the POS terminal is provided on a user interface of the electronic device at block 1210. The guidance may be provided using any of the techniques described above in FIGS. 1-10. The electronic device may achieve the preferred position at block 1212, as described above. Transaction data may be provided by way of a wireless communication connection or a magnetic reader after the electronic device is in the preferred position at block 1214, as described above. Information related to the determined position is stored in storage at block 1216. Such storage may be local on the electronic device 104 or in remote storage 130 which can be accessed in a remote storage device.

Turning now to 13, a flow chart shows a method of testing and storing data associated with mobile payment terminals using an electronic device. A POS terminal is identified at block 1302. The POS terminal may be identified as a specific model of a POS terminal, or a category or class of POS terminals that may have a common location for a magnetic reader. The location of an electronic device with respect to the POS terminal is determined at block 1304. The location of the electronic device with respect to the POS terminal can be determined as described above in FIGS. 1-12 for example. It is then determined if a transaction is successful when initiated by the user of the electronic device at block 1306. If not, the user is directed to change the location of the electronic device at block 1308. The location of the electronic device with respect to the POS terminal is stored on at least one of the electronic device or remote storage at block 1310. That is, the location of the electronic device with respect to the POS terminal, and the success of the transaction can be used to determine an optimal or a preferred location for the electronic device to increase the likelihood of a successful transaction. While data associated with a single device may be stored locally on the electronic device or remotely, data associated with multiple devices may be stored remotely, and aggregated in a learning process to improve the guidance to a user of the electronic device, as will be described in more detail in reference to FIG. 14.

Figure 14:
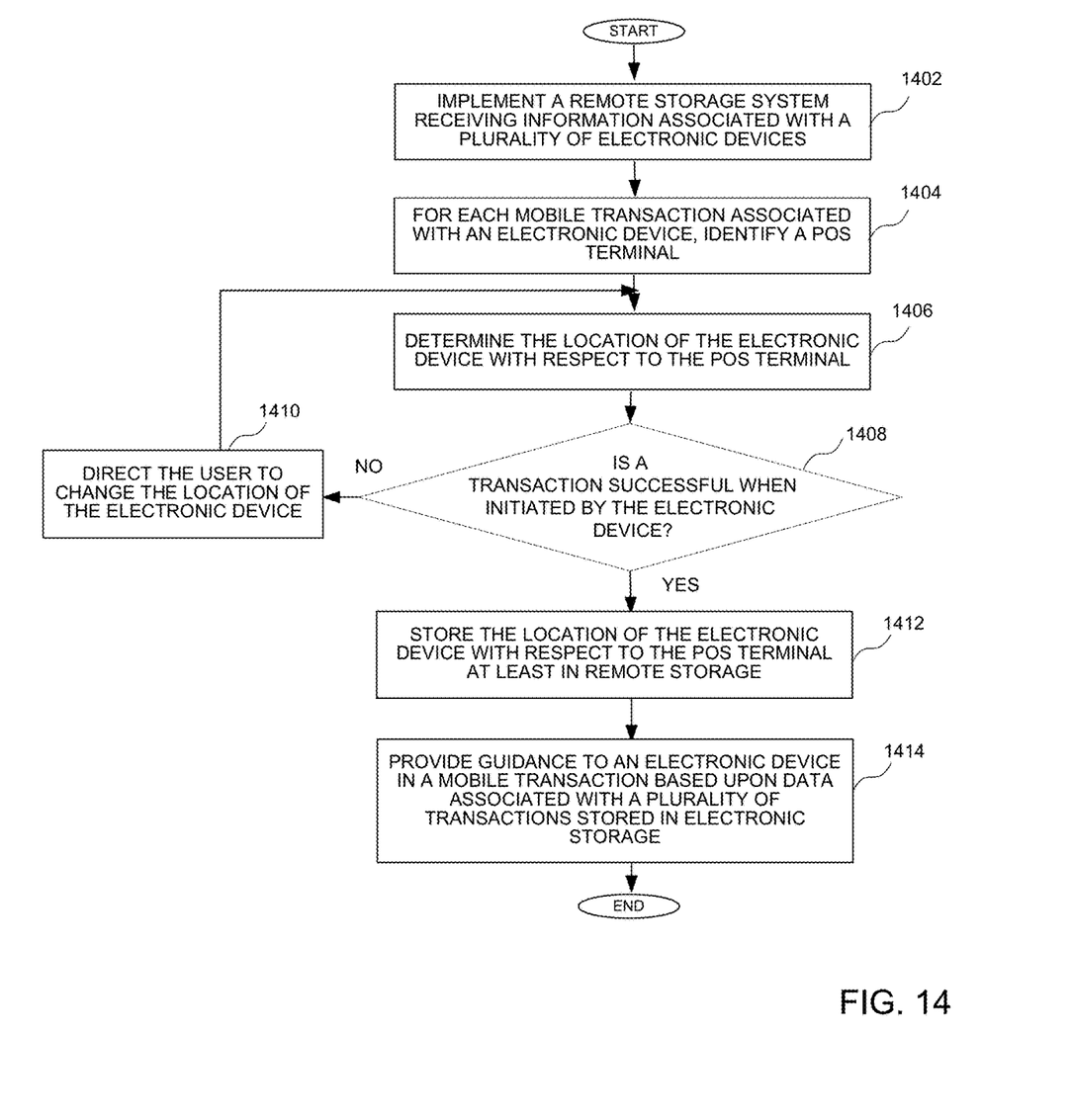
FIG. 14 illustrates a flow chart showing an exemplary method of testing and storing data associated with mobile payment transactions using multiple electronic devices.

Turning now to 14, a flow chart shows a method of testing and storing data associated with mobile payment terminals using multiple electronic devices. A remote storage system receiving information associated with a plurality of mobile devices is implemented at block 1402. A POS terminal is identified for each mobile transaction associated with an electronic device, at block 1404. The location of the electronic device with respect to the POS terminal is determined at block 1406. It is then determined whether the transaction is successful when initiated by the user of the electronic device at block 1408. The user is directed to change the location of the electronic device at block 1410. The location of the electronic device with respect to the POS terminal is stored at least in remote storage at block 1412. Guidance is provided to an electronic device in a mobile transaction based upon data associated with a plurality of transactions stored in remote storage at block 1414. This information may then be aggregated in a learning process and provided to the electronic device, which may be periodically updated.

Alternatively, the electronic device may receive the guidance by way of the remote server during a transaction.

The methods set forth in FIGS. 10-14 could be implemented on a processor of the electronic device alone or in conjunction with other devices, and may be implemented on a non-transitory computer-readable storage medium. For example, the non-transitory computer-readable storage medium may have data stored therein representing instructions executable by a processor to perform a method comprising initiating, by an electronic device, the transaction with the POS terminal; analyzing images captured by a camera of the electronic device; and identifying the POS terminal based upon the images. Various other elements of the method may be implemented according to FIGS. 10-14.

It can therefore be appreciated that new circuits for and methods of enabling a point of sale (POS) device to perform a transaction have been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A method of enabling a point of sale (POS) terminal to perform a transaction, the method comprising:
   initiating, by an electronic device, the transaction with the POS terminal;
   analyzing at least one image of the POS terminal captured by a camera of the electronic device;
   identifying at least one of a class or a model of the POS terminal based upon the at least one image; and
   determining a location of the electronic device relative to the POS terminal.

2. The method of claim 1 further comprising determining an orientation of the electronic device relative to the POS terminal.

3. The method of claim 1 wherein determining a location of the electronic device relative to the POS terminal comprises employing a proximity sensor.

4. The method of claim 1 further comprising providing guidance, by the electronic device, as to a preferred position of the electronic device relative to the POS terminal on a user interface of the electronic device.

5. The method of claim 4 further comprising initiating, by the electronic device, the transaction after the preferred position has been achieved.

6. The method of claim 1 further comprising directing a user of the electronic device to provide transaction data by way of a wireless communication circuit or a magnetic reader after the POS terminal has been identified.

7. The method of claim 1 further comprising providing a delay in a timeout period for initiating the transaction while the electronic device is identifying the POS terminal.

8. The method of claim 1 further comprising employing computer vision techniques to identify the POS terminal.

9. The method of claim 5 further comprising storing information related to a determined position of the electronic device relative to the POS terminal in remote storage.

10. An electronic device comprising:
    a processor configured to initiate a POS transaction with a POS terminal; and
    a camera, coupled to the processor, configured to capture at least one image of the POS terminal;
    wherein the processor identifies at least one of a class or a model of the POS terminal based upon the at least one image; and
    wherein the processor determines a location of the electronic device relative to the POS terminal.

11. The electronic device of claim 10 wherein the processor further determines an orientation of the electronic device relative to the POS terminal.

12. The electronic device of claim 10, further comprising,
    a sensor coupled to the processor,
    wherein the location of the electronic device relative to the POS terminal is determined by the processor based on input from the sensor.

13. The electronic device of claim 12, wherein the sensor comprises one of an infrared (IR) sensor, a near field communication (NFC) sensor, a time of flight sensor, a depth sensor, an ultrasonic sensor, or a radio frequency (RF) sensor.

14. The electronic device of claim 10, further comprising,
    a display coupled to the processor,
    wherein the processor further provides guidance as to a preferred position of the electronic device relative to the POS terminal on a user interface output to the display.

15. The electronic device of claim 14, the processor further configured to initiate the POS transaction after the preferred position has been achieved.

16. The electronic device of claim 10, the processor further configured to receive input to provide transaction data by way of a wireless communication connection or a magnetic reader after the POS terminal has been identified.

17. The electronic device of claim 10, the processor further configured to provide a delay in a timeout period to initiate the POS transaction while the POS terminal is being identified.

18. The electronic device of claim 14 wherein the processor further employs computer vision techniques to identify the POS terminal.

19. The electronic device of claim 14 wherein the processor further directs the electronic device to provide transaction data by way of a wireless communication connection or a magnetic reader after the preferred position is achieved.

20. The electronic device of claim 19 wherein the processor provides a prompt on the display to provide transaction data by way of a wireless communication connection or a magnetic reader.

21. The electronic device of claim 20 further comprising providing a delay in a timeout period for initiating a transaction while providing guidance as to the preferred position.

22. The electronic device of claim 11 further comprising a memory element for storing information related to the determined orientation in at least one of a memory of an electronic device or remote storage.

23. The electronic device of claim 22 wherein the memory element stores information related to transactions associated with a plurality of mobile devices and a plurality of POS terminals.

24. A non-transitory computer-readable storage medium having data stored therein representing instructions executable by a processor to perform a method comprising:
    initiating, by an electronic device, a transaction with a POS terminal;
    analyzing at least one image captured by a camera of the electronic device;
    identifying at least one of a class or a model of the POS terminal based upon the at least one image; and
    determining a location of the electronic device relative to the POS terminal.

25. The non-transitory computer-readable storage medium of claim 24 further comprising determining an orientation of the electronic device relative to the POS terminal.

26. The non-transitory computer-readable storage medium of claim 24 wherein determining a location of the electronic device relative to the POS terminal further comprises receiving input from at least one sensor.

27. The non-transitory computer-readable storage medium of claim 24 further comprising providing guidance, by the electronic device, as to a preferred position of the electronic device relative to the POS terminal on a user interface of the electronic device.

28. The non-transitory computer-readable storage medium of claim 27 further comprising initiating, by the electronic device, the transaction after the preferred position has been achieved.

29. The non-transitory computer-readable storage medium of claim 24 further comprising providing transaction data by way of a wireless communication connection or a magnetic reader after the POS terminal has been identified.

30. The non-transitory computer-readable storage medium of claim 24 further comprising providing a delay in a timeout period for initiating the transaction while the electronic device is identifying the POS terminal.

* * * * *